Patented Feb. 10, 1953

2,628,246

UNITED STATES PATENT OFFICE 2,628,246

METHOD FOR THE PREPARATION OF UNSATURATED SILANES

Charles A. MacKenzie, East Orange, and John B. Rust, Montclair, N. J., assignors, by direct and mesne assignments, of one-half to Montclair Research Corporation, a corporation of New Jersey, and one-half to Ellis-Foster Company, a corporation of New Jersey No Drawing. Application March 11, 1946, Serial No. 653,713

9 Claims. (Cl. 260—448.2)

This invention relates to organic silicon derivatives containing hydrocarbon groups, and particularly unsaturated groups such as allyl and substituted allyl groups, to processes of making such derivatives, to compositions containing the same, and to utilization of such derivatives and compositions.

Heretofore alkyl and aryl silicon derivatives have been made primarily by the action of alkyl- or aryl-magnesium halides on silicon halides or ethyl orthosilicate. It has also been reported that certain other metal alkyls such as zinc and mercury alkyls can be employed. In using the alkyl- or aryl-magnesium halides, relatively large amounts of ethyl ether were preferably employed and the process carried out in at least two steps including, first, the preparation of the Grignard reagent, and second, reaction of the silicon halide or related material with the Grignard reagent.

Among the objects of the present invention is the production of carbon-silicon bonded materials produced by economic and simple methods.

Other objects include the production of organo silicon derivatives containing unsaturated groups such as allyl and substituted allyl groups.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

In accordance with the present invention it has been found possible to produce substituted silanes or silicanes or silicon oxides in which the substituent group is an unsaturated group, such as allyl or substituted allyl groups, having the general formula —CH$_2$—CR=CHR′, where R and R′ are either hydrogen or organic radicals, preferably where one of the groups R and R′ are hydrogen and the other is an organic radical, particularly a monovalent organic radical including hydrocarbon radicals, more specifically the alkyls, and particularly methyl and other lower alkyls. Such groups include the groups variously denominated as allyl, butenyl, crotyl, methallyl, etc. Such silicon derivatives include, for example, allyl silanes (silicanes) and allyl silicon oxides and hydroxides containing at least two allyl or substituted allyl groups, such as tetraallyl silane, tetramethallyl silane, tetracrotyl silane, hexa-allyl silicon oxide, low polymers of diallyl silicon hydroxide and allyl silicon trihydroxide, diallyl diethyl silane, triallyl silicon hydroxide, dicrotyl diphenyl silane, hexamethaethyl allyl silicon oxide, and the like. It will be seen that the substituent hydrocarbon groups in the allyl radical may be either the same or different, and further, that the silanes or silicanes or silicon oxides produced may contain mixed substituent groups as long as one or more of such substituent groups is an allyl or substituted allyl group of the character set forth above.

The silicon derivatives of the present invention may be made by the interaction of a Grignard reagent with silicon tetrahalide or related material according to usual methods of preparing silicon derivatives. They may, however, more desirably be produced by a one-step process wherein an organo halide, particularly an alkyl or aryl halide, is reacted with a silicon halide or oxyhalide such as silicon tetrahalide in the presence of magnesium, desirably at an elevated temperature, and most effectively when the reaction is carried out so that at least one component of the reaction mixture refluxes during the reaction. While magnesium may be utilized in such one-step processes effectively, lithium may also be employed similarly. It has been found that such one-step processes are eminently satisfactory for making the unsaturated silicon derivatives of the present invention, since when an attempt is made to utilize a Grignard reagent using an unsaturated alkyl halide, side reactions set in and very poor yields are obtained.

Furthermore, it has been found that a solvent may or may not be employed in the reaction or if desired, a solvent may be added at the end of the reaction to dilute the reaction mixture. When a solvent is employed, it may be an ether, a hydrocarbon such as an aromatic, aliphatic or alicyclic hydrocarbon, an ester, a ketone, and the like. In general, solvents may be used which are employed in the formation of Grignard reagents.

It has also been found that in general, the concurrent reaction of an organic halide with silicon tetrachloride or other silicon halide is accelerated by the presence of some solvent in which a Grignard reagent is easily formed such as ethyl ether, ethyl orthosilicate and the like, or of the Grignard reagent itself. Catalysts generally employed for accelerating Grignard reactions may be present.

Where the one-step process is employed utilizing either magnesium or lithium, the reaction may be carried out in various ways but preferably a mixture of the silicon halide or related material with the allyl halide or similar derivative is added to the magnesium or lithium in the presence of a solvent when the latter is employed, under conditions desirably where refluxing takes place; or the allyl halide or similar material may be added to a mixture of the silicon halide or related material with the magnesium or lithium. Where necessary the reaction may be initiated by the presence of catalysts or Grignard reagents, etc., as indicated above.

Desirably the organic halide or related material and the silicon halide or related material are used in approximately at least a molar ratio of 1:1. The proportions of the reaction ingredients may be varied substantially and may, for example, vary from less than 1 mol of organic halide or related material to 4 mols of organic halide or related material based on 1 mol of the silicon halide or related material. In the preparation of tetra-allyl silane, for example, the ratio of allyl halide, such as chloride, to silicon tetrahalide, such as silicon tetrachloride, should be at least 1:1 and desirably is 5:1 or higher.

In some cases the products of the present invention may be hydrolyzed in water and by subsequent heating be converted into hard, tough plastic materials. On the other hand, the hydrolytic products may be dissolved in suitable solvents and used as baking lacquer materials.

The silicon products prepared in accordance with this invention may be preserved for future use by placing in solvents. A large variety of solvents may be employed including hydrocarbon solvents both aliphatic and aromatic, such as hexane, benzene, toluene, etc. Ethers such as dimethyl, diethyl, diisopropyl, dibutyl ethers or mixed ethers may also be used as well as esters such as ethyl, butyl or amyl acetates; alcohols, etc. When the use of a storage solvent is desired, it is sometimes advantageous to add the solvent to the reaction mixture before it is poured on ice to hydrolyze it when hydrolysis is being carried out.

While ethyl orthosilicate has been referred to above as illustrative of accelerating solvents or catalysts, other esters of orthosilicic acid may be employed such as ethyl orthosilicate, methylorthosilicate, benzyl orthosilicate, and the like.

While the silicon halide employed is desirably the tetrahalide and more particularly the silicon tetrachloride, other silicon halides and derivatives may be utilized including silicon tetrabromide, and silicon tetraiodide, as well as other derivatives such as disilicon hexahalides, trisilicon octahalides, polysilicon polyhalides, silicon oxychlorides, and the like.

The derivatives or hydrolyzed or partially hydrolyzed or etherified materials may be used as lacquers or adhesives, either alone or in admixture with other completely reacted or potentially reactive resins. Such resins include natural resins such as rosin, copal, shellac, etc., as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives including the esters of acrylic and methacrylic acids, etc.

The silicon derivatives produced in accordance with the present invention may be used as textile finishing compositions either alone, or in solution in solvents to produce special effects such as waterproofing, creaseproofing, wrinkleproofing, etc.

They may also be utilized in admixture with or without other resins and inorganic or organic fillers and used for hot molding, extruding, casting, etc. Inorganic fillers include both fibrous and non-fibrous materials such as the clays like bentonite, mica, asbestos, glass, or cellulosic materials such as paper, cotton, wood flour, etc.

Silicon derivatives prepared under the present invention may be used in lubricating oils and as additives to both hydrocarbon oils such as lubricating oils and also for inclusion with vegetable oils, including both drying oils such as linseed oil, and China-wood oil, semi-drying oils such as soya bean oil, etc., non-drying oils such as castor oil, etc.

Many of the products produced in accordance with the present invention exhibit excellent electrical properties and may be used either per se or as varnishes, etc., in producing coatings or articles, or coated articles for electrical insulation. These silicon derivatives may also be used in the production of laminated products for bonding together two or more sheets of the same or different organic or inorganic materials.

The following examples will illustrate the production of allyl derivatives by the methods herein set forth, the parts being by weight unless otherwise indicated.

*Example 1.*—2 parts of allyl bromide and 6 parts of magnesium turnings were placed in 108 parts of ethyl ether. After the reaction had started, and was proceeding at a moderate rate, a mixture of 28.2 parts of allyl bromide and 42.5 parts of silicon tetrachloride was added slowly, with stirring, over a period of 1 hour. The mixture was then heated on a hot water bath for 1 hour, cooled and poured on ice. The ether layer was washed with water to remove hydrogen chloride. After evaporation of the ether, a viscous liquid was obtained. This liquid, when heated at 120° C. for 4 hours, changed to a clear, brittle, infusible resin.

*Example 2.*—400 grams of ethyl ether was placed in a 3-necked, stirrer-equipped flask, with 30 g. of magnesium turnings (2.5 moles). A Grignard reaction was started in a test tube with 1 ml. of methyl iodide. This product was added to the reaction flask. A mixture of 76 g. allyl chloride (1 mole) and 34 g. silicon tetrachloride (.2 mole) dissolved in 100 ml. of ethyl ether, was added slowly over a 3 hour period to the stirred mixture. A large amount of solid formed and the mixture refluxed moderately. The mixture was next poured on cracked ice and the ether layer separated and dried over CaCl₂. The ether was removed by distillation through a 4-bulb pear column. The major portion of the residue distilled at 77° C. at 3 mm. A sample of the product was distilled at 755 mm. It boiled with considerable decomposition at approximately 205° C.

|  | Percent |
|---|---|
| Silicon, calculated for $Si(CH_2CH=CH_2)_4$ | 14.6 |
| Silicon, found | 14.4 |

Materials such as tetra-allyl silane and other derivatives produced in accordance with the present invention may be utilized in producing insoluble, infusible addition polymers. Such polymers can be produced which have substantially no cold flow and are free from flaws, air bubbles and the like.

Tetra-allyl silane is a colorless liquid boiling at 77° C. at 3 mm. It is an unsaturated silicon compound containing no hydrolyzable atomic linkages and thus does not undergo hydrolysis. Although it contains a plurality of unsaturated radicals it does not polymerize to a solid when heated with a peroxide catalyst for a long time. However, it has been found that, when mixed with liquids capable by themselves of undergoing addition polymerization to form thermoplastics, tetra-allyl silane polymerized therewith to form solid copolymers which are insoluble and infusible even when the silane is present in very small amounts in the copolymerizing mixture. Other unsaturated silicon derivatives of the same type also undergo copolymerization when heated with a compound capable of addition polymerization.

Thus the present materials and disclosure include copolymerizing mixtures of substances which are capable of addition polymerization and which contains a single $CH_2=C<$ group, such as styrene and styrene derivatives, esters of methacrylic acid, esters of acrylic acid, vinyl esters and vinyl halides, with an unsaturated silicon compound which is incapable of hydrolysis, the latter compound comprising desirably up to about 40% of the mixture. It has been proposed to copolymerize substances which are capable of undergoing additive polymerization, with allyl esters of silicic acid. However, such esters readily undergo hydrolysis to form silica. Thus plastics, lacquers, castings, and so forth, made from these materials have a tendency to deteriorate, at least on the surface, over a period of time in a moist atmosphere. By utilizing non-hydrolyzable, unsaturated silicon derivatives produced in accordance with the present invention, such as tetra-allyl silane, copolymerization with the substances stated above may be utilized to produce desirable products.

It is known that thermoplastic materials derived from the polymerization of styrene, methyl methacrylate, vinyl acetate, ethyl methacrylate, and the like, may be easily molded. These moldings, however, especially when subjected to slightly elevated temperatures or small stresses over a length of time, tend to deform permanently. This phenomenon is called "cold flow." By subjecting the addition-polymerizable compounds to copolymerization with an unsaturated, non-hydrolyzable silicon compound which possesses at least two functional groups, cross-linking of the macropolymer chains occurs, with decrease in solubility of the polymer and increase in the resistance to cold flow. Such copolymers possess added strength and when an unsaturated silicon derivative containing oxygen is used, much greater heat resistance is obtained in the copolymerized plastic. Thus by using the unsaturated silicon derivatives of the present invention we may secure copolymers which tend to resist decomposition, yellowing and so forth at higher temperatures and which are insoluble or only slightly soluble in a number of organic solvents, and furthermore, have a reduced tendency toward cold flow.

The mixture of unsaturated silicon compound and addition-polymerizable liquid may be copolymerized in the presence of other substances such as resins and plasticizers. For example, polymerized styrene, acrylic or methacrylic esters, vinyl esters, etc., may be added to the mixture resulting in a final polymer of greater thermal rigidity and solvent resistance than possessed by the polymeric materials which are introduced.

Examples of the production of such copolymerized materials are given below, the parts again being by weight unless otherwise indicated.

Example 3.—Mixtures of vinyl acetate and tetra-allyl silane were prepared with the silane comprising the following proportions by weight: 20%, 15%, 1.0%, 0.0%. 1% of benzoyl peroxide was added in each case. The samples were heated at 70° C. until gelation occurred. The silane caused slight inhibition of the polymerization, the difference being particularly noticeable with the samples containing the higher portions of silane. The temperature was raised, during a one hour period, to 100° C. and kept at this point for 3 hours. The samples were then cooled and placed in acetone. The vinyl acetone product containing no silane went into solution whereas the ether products swelled but remained insoluble in the solvent. Likewise, when heated on a hot plate, the vinyl acetate product containing no silane fused to a viscous mass while the others remained solid.

Example 4.—Mixtures of methyl methacrylate and tetra-allyl silane were prepared with the silane comprising the following proportions by weight: 20%, 5%, 1.0%, 0.0%. 1% of benzoyl peroxide was added in each case. The samples were heated at 75° C. for 4 hours. The products were cooled and placed in acetone overnight. The sample containing no silane dissolved in acetone whereas the other products swelled but remained insoluble in the solvent.

Example 5.—Mixtures of butyl methacrylate and tetra-allyl silane were prepared with the silane comprising the following proportions by weight: 20%, 1%, 0.0%. 1% of benzoyl peroxide was added in each case. The mixtures were heated for 18 hours at 100° C. They were then cooled and the solids obtained were placed in acetone. The sample containing no silane dissolved in acetone whereas the other products swelled but remained insoluble in the solvent.

This application is a continuation in part of application Serial No. 509,017, filed November 3, 1943, now abandoned, and application Serial No. 555,901, filed September 26, 1944, now U. S. Patent No. 2,438,612.

Having thus set forth our invention, we claim:

1. A process of preparing silicane derivatives which comprises heating an organic halide having the formula $X-CH_2-CR=CHR'$ in which one of the groups R and R' is hydrogen and the other is a lower alkyl radical, and X is a halogen selected from chlorine and bromine, with a metal selected from the group consisting of magnesium and lithium, and a silicon halide selected from the group consisting of compounds having the formulas $SiX_4$ and $R''_2SiX_2$ where X is halogen and R'' is selected from lower alkyl and monocyclic aryl radicals.

2. A process of preparing silicane derivatives which comprises heating an organic halide having the formula $X-CH_2-CR=CHR'$ in which one of the groups R and R' is hydrogen and the other is a lower alkyl radical, and X is a halogen selected from chlorine and bromine, with a metal selected from the group consisting of magnesium and lithium, and a silicon halide in which all valences of the silicon are occupied by halogen.

3. A process of preparing silicane derivatives which comprises heating an organic halide having the formula $X-CH_2-CR=CHR'$ in which one of the groups R and R' is hydrogen and the other is a lower alkyl radical, and X is a halogen selected from chlorine and bromine, with magnesium and silicon tetrachloride in the molal ratio of organic halide to the silicon tetrachloride of at least 1:1.

4. A process of preparing tetra-allyl silicane which comprises heating a substance selected from the group consisting of allyl bromide and allyl chloride in the presence of a metal selected from the group consisting of magnesium and lithium, and silicon tetrachloride wherein the molal ratio of the allyl halide to the silicon tetrachloride is at least 1:1.

5. A process of preparing tetra-allyl silicane which comprises heating a substance selected from the group consisting of allyl bromide and allyl chloride, magnesium and silicon tetrachloride wherein the molal ratio of the allyl halide to the silicon tetrachloride is at least 1:1.

6. A process of preparing an allyl silicane which comprises heating a substance selected from the group consisting of allyl bromide and allyl chloride in the presence of a metal selected from the group consisting of magnesium and lithium, and silicon tetrachloride.

7. A process of preparing tetra-allyl silicane which comprises heating allyl chloride, magnesium and silicon tetrachloride in the presence of anhydrous ethyl ether wherein the molal ratio of the allyl chloride to the silicon tetrachloride is at least 1:1.

8. A process of preparing an allyl silicon derivative which comprises heating allyl chloride, magnesium, and a silicon halide selected from the group consisting of compounds having the formulas $SiX_4$ and $R''_2SiX_2$ where X is halogen and $R''$ is selected from lower alkyl and monocyclic aryl radicals in the presence of anhydrous ethyl ether wherein the molal ratio of the allyl chloride to the silicon halide is at least 1:1.

9. A process of preparing tetra-allyl silicane which comprises heating a substance selected from the group consisting of allyl bromide and allyl chloride, magnesium and silicon tetrachloride in the presence of anhydrous ethyl ether wherein the molal ratio of the allyl halide to the silicon tetrachloride is at least 1:1.

CHARLES A. MacKENZIE.
JOHN B. RUST.

REFERENCES CITED

The following references are of record in the file of this patent:

UNITED STATES PATENTS

| Number | Name | Date |
|---|---|---|
| 2,505,431 | Rust et al. | Apr. 25, 1950 |

OTHER REFERENCES

Schumb et al.: "Jour. Am. Chem. Soc.," vol. 61 (1939), pp. 363–66.